(12) United States Patent
Brym et al.

(10) Patent No.: US 9,238,764 B2
(45) Date of Patent: Jan. 19, 2016

(54) TWO-COMPONENT COATING COMPOSITIONS

(75) Inventors: Markus Brym, Limburgerhof (DE); Christine Rösch, Mainz (DE); Christina Haaf, Hemsbach (DE); Angelika Maria Steinbrecher, Stuttgart (DE); Harald Schäfer, Mannheim (DE); Oihana Elizalde, Charlotte, NC (US)

(73) Assignee: BASF SE, Ludwigshafen (DE)

( * ) Notice: Subject to any disclaimer, the term of this patent is extended or adjusted under 35 U.S.C. 154(b) by 195 days.

(21) Appl. No.: 13/433,711

(22) Filed: Mar. 29, 2012

(65) Prior Publication Data

US 2012/0251730 A1 Oct. 4, 2012

Related U.S. Application Data

(60) Provisional application No. 61/469,831, filed on Mar. 31, 2011.

(51) Int. Cl.
| | | |
|---|---|---|
| *C09D 137/00* | (2006.01) |
| *C09J 133/06* | (2006.01) |
| *C09J 133/14* | (2006.01) |
| *C09D 175/12* | (2006.01) |
| *C08F 224/00* | (2006.01) |
| *C08F 24/00* | (2006.01) |
| *C08F 18/24* | (2006.01) |
| *C08F 220/14* | (2006.01) |
| *C08F 220/28* | (2006.01) |

(52) U.S. Cl.
CPC .............. *C09J 133/06* (2013.01); *C09J 133/14* (2013.01); *C08F 18/24* (2013.01); *C08F 24/00* (2013.01); *C08F 220/14* (2013.01); *C08F 224/00* (2013.01); *C08F 2220/283* (2013.01); *C09D 137/00* (2013.01); *C09D 175/12* (2013.01)

(58) Field of Classification Search
CPC ............. C08F 220/14; C08F 2220/283; C08F 224/00; C08F 24/00; C08F 18/24; C09J 133/06; C09J 133/14; C09D 137/00; C09D 175/12
USPC ........................................... 526/269; 524/236
See application file for complete search history.

(56) References Cited

U.S. PATENT DOCUMENTS

| 4,882,391 A * | 11/1989 | Brindopke et al. ......... 525/327.2 |
| 5,567,527 A * | 10/1996 | Webster et al. ............... 428/412 |
| 2008/0121851 A1 | 5/2008 | Reinheimer |
| 2012/0100394 A1 | 4/2012 | Richert et al. |

FOREIGN PATENT DOCUMENTS

| BE | 1009543 A4 | 5/1997 |
| CN | 101775137 | 7/2010 |
| DE | 10 2009 007 624 A1 | 8/2010 |
| EP | 0 001 088 A1 | 3/1979 |
| EP | 0 272 664 A2 | 6/1988 |
| EP | 0 358 358 A2 | 3/1990 |
| EP | 0 737 726 A1 | 10/1996 |
| EP | 1 526 150 A1 | 4/2005 |
| FR | 2 861 738 A1 | 5/2005 |
| GB | 2 444 364 A | 6/2008 |
| JP | 2705131 B2 * | 1/1998 |
| WO | WO 9723516 A1 * | 7/1997 |
| WO | WO 03/048215 A1 | 6/2003 |
| WO | WO 2004/060935 A1 | 7/2004 |
| WO | WO 2004/060945 A1 | 7/2004 |
| WO | WO 2006/022899 A2 | 3/2006 |

OTHER PUBLICATIONS

U.S. Appl. No. 13/660,253, filed Oct. 25, 2012, Schaefer, et al.
International Search Report and Written Opinion issued on May 7, 2012 in corresponding International Application No. PCT/EP2012/055091 filed on Mar. 22, 2012 (with an English Translation of Categories).
Figovsky, et al., "Features of Reaction Amino-cyclocarbonate for Production of New Type Nonisocyanate Polyurethane Coatings", Macromol. Symp., vol. 187, pp. 325-332 (2002).
Yu, et al., "Study on Preparation and Performance of Non-Isocyanate Polyurethane Coatings", Paint & Coatings Industry, vol. 41, Issue 3, pp. 35-37 (Mar. 1, 2011) (English translation -6 pgs).

* cited by examiner

*Primary Examiner* — Ling Choi
*Assistant Examiner* — David L Miller
(74) *Attorney, Agent, or Firm* — Oblon, McClelland, Maier & Neustadt, L.L.P.

(57) ABSTRACT

The present invention describes two-component coating compositions which for curing require no polyisocyanates or melamine-formaldehyde resins as crosslinkers.

17 Claims, No Drawings

TWO-COMPONENT COATING COMPOSITIONS

Two-component coating compositions generally comprise a binder and a crosslinker, with polyisocyanates or melamine-formaldehyde resins frequently being involved. The former are frequently sensitizing, and the latter contain a residual toxic formaldehyde content, or toxic formaldehyde is given off from the melamine-formaldehyde resins.

There is therefore an interest in two-component coating compositions which possess an alternative curing mechanism.

EP 1088 A1 provides a general description of the preparation of copolymers containing glycerol carbonate (meth) acrylate, and also of the use thereof for pigments or as coating materials. There is merely a reference to crosslinking agents in the most general form, but there is no detailed disclosure in relation to crosslinking.

EP 272664 A2 describes copolymers comprising glycerol carbonate (meth)acrylate and hydroxy-yl-bearing monomers, which are capable of curng with polyisocyanates or with melamine-formaldehyde resins.

The main cure takes place via a reaction between isocyanate groups and hydroxyl groups, although a subordinate cure via amines, formed by hydrolysis of excess isocyanate, is mentioned.

EP 358358 B1 describes mixtures of acrylic copolymers, which carry epoxy, carbonate or acetoacetoxy groups, with mono-, di- or polyamines, which may have primary and/or secondary amine groups, as pigment dispersants, with which the pigment particles exhibit reduced agglomeration. The pigment pastes obtained in this way are then incorporated into coating compositions.

EP 737726 A1 describes one-component mixtures of copolymers for curing by Michael addition, comprising carbonate groups either as isolated components, in the form of ethylene carbonate, for example, or in copolymerized form.

The component containing carbonate groups acts here as a cocatalyst for the onium salt catalysts employed, and does not itself participate in the cure.

WO 03/048215 A1 describes the reaction of copolymers having cyclic carbonate groups with amines. The aim of the reaction is to create reactive sites for subsequent derivatization of the copolymer by graft reaction, and it does not produce crosslinking of copolymers. Similar systems are described in WO 2004/060935 A1 and WO 2004/060945 A1.

BE 1009543 describes the combination of carbonate-group-containing oligomers or polymers with an amine-group-containing crosslinker.

The amine-group-containing crosslinker involves a specific structure which has at least two primary amine groups positioned β, γ or δ to a tertiary amine group.

Polyamines explicitly disclosed include the following (page 3, lines 7 to 10): N,N,N',N'-tetrakis(3'-aminopropyl)-1,4-diaminobutane, tris(2'-aminoethyl)amine, and tris(aminopropyl)amine.

The combination is used in coatings featuring good gloss, good acetone resistance and good curing and hardness, and also blocking resistance.

This has the disadvantage that highly electron-rich tertiary amine groups remain in the completed coatings, and lead to yellowing of the coatings.

The object on which the present invention was based was that of providing coating compositions which can be cured by an alternative crosslinking method. The coating compositions ought to be able to be given variable constitutions, allowing the potlife and properties of the coating to be varied widely.

The coating compositions are intended to produce coatings which in at least one of the parameters of hardness and/or flexibility produce an improvement over the prior art. For use in outdoor applications, preferred coating compositions are additionally to exhibit relatively low yellowing.

This object is achieved by means of two-component coating compositions comprising
- at least one copolymer (A) which is obtainable by radical copolymerization and carries at least one cyclic carbonate group,
- at least one diamine or polyamine (B) which has at least two amine groups selected from the group consisting of primary and secondary amine groups,
- optionally at least one solvent (C),
- optionally at least one pigment (D), and
- optionally at least one additive (E), wherein the compound (B) has a fraction of tertiary amine groups, based on the total amount of primary, secondary, and tertiary amine groups, of less than 20%.

The present invention further provides for the use of such two-component coating compositions for the coating of substrates.

The copolymer (A) is preferably obtainable by radical polymerization of a monomer mixture of
- (a1) at least one (meth)acrylate containing at least one cyclic carbonate group,
- (a2) at least one (cyclo)alkyl (meth)acrylate,
- (a3) at least one vinylaromatic monomer,
- (a4) optionally at least one hydroxyalkyl (meth)acrylate, and
- (a5) optionally at least one acid-group-containing monomer.

In minor amounts it is possible for other monomers to be incorporated into the copolymer (A), but preferably no monomers other than the monomers (a1) to (a5) recited above are used.

These monomers are in detail the following compounds:

(a1) At Least One (Meth)Acrylate Containing at Least One Cyclic Carbonate Group:

The monomer (a1) may contain, for example, one to three, preferably one or two, and more preferably precisely one cyclic carbonate group. It may constitute a mixture of two or more monomers, examples being two to four, preferably two or three, and more preferably two monomers, but the use of precisely one monomer (a1) is preferred.

By a "cyclic carbonate group" is preferably meant, in accordance with the invention, 2-oxo-1,3-dioxolane or 2-oxo-1,3-dioxane structures, preferably 2-oxo-1,3-dioxolane structures.

The monomers (a1) are preferably (2-oxo-1,3-dioxolan-4-yl)methyl acrylate (GCA) or (2-oxo-1,3-dioxolan-4-yl)methyl methacrylate (GCMA), 2-oxo-1,3-dioxolane-4-carboxylic acid acryloyloxymethyl ester, 2-oxo-1,3-dioxolane-4-carboxylic acid 2-methylacryloyloxymethyl ester, preferably (2-oxo-1,3-dioxolan-4-yl)methyl acrylate (GCA).

(a2) At Least One (Cyclo)Alkyl (Meth)Acrylate:

The monomer (a2) may be a mixture of two or more monomers, examples being two to four, preferably two or three, and more preferably two monomers, but the use of precisely one monomer (a2) is preferred.

The term (cyclo)alkyl refers collectively to "cycloalkyl" and "alkyl", preferably alkyl.

Examples of (cyclo)alkyl (meth)acrylates are cycloalkyl (meth)acrylates whose cycloalkyl radical is formed from a three- to twelve-membered ring, preferably a five- to twelve-membered ring, and more preferably a five- or six-membered ring.

More particularly preferred are cyclopentyl (meth)acrylate, cyclohexyl (meth)acrylate, cyclooctyl (meth)acrylate, and cyclododecyl (meth)acrylate, more preferably cyclopentyl (meth)acrylate, cyclohexyl (meth)acrylate and cyclododecyl (meth)acrylate, very preferably cyclopentyl (meth)acrylate and cyclohexyl (meth)acrylate, and more particularly cyclohexyl (meth)acrylate, the acrylates being preferred in each case over the methacrylates.

Examples of alkyl (meth)acrylates are alkyl (meth)acrylates whose alkyl radical comprises one to 20 carbon atoms, preferably one to 12, and more preferably one to 8.

More particularly preferred are methyl (meth)acrylate, ethyl (meth)acrylate, isopropyl (meth)acrylate, n-propyl (meth)acrylate, n-butyl (meth)acrylate, isobutyl (meth)acrylate, sec-butyl (meth)acrylate, tert-butyl (meth)acrylate, n-hexyl (meth)acrylate, n-heptyl (meth)acrylate, n-octyl (meth)acrylate, n-decyl (meth)acrylate, n-dodecyl (meth)acrylate, n-tetradecyl (meth)acrylate, n-hexadecyl (meth)acrylate, n-heptadecyl (meth)acrylate, n-octadecyl (meth)acrylate, n-eicosyl (meth)acrylate, 2-ethylhexyl (meth)acrylate, and 2-propylheptyl (meth)acrylate, more preferably methyl (meth)acrylate, ethyl (meth)acrylate, n-butyl (meth)acrylate, tert-butyl (meth)acrylate, and 2-ethylhexyl (meth)acrylate, very preferably methyl acrylate, methyl methacrylate, ethyl acrylate, n-butyl acrylate, tert-butyl acrylate, and 2-ethylhexyl acrylate, and especially preferably n-butyl acrylate and 2-ethylhexyl acrylate.

(a3) At Least One Vinylaromatic Monomer:

The monomer (a3) may be a mixture of two or more monomers, as for example two to four, preferably two or three, and more preferably two monomers, but the use of precisely one monomer (a3) is preferred.

Preferred monomers (a3) are styrene, vinyltoluene, vinylnaphthalene, α- and α-methylstyrene, α-butylstyrene, 4-n-butylstyrene, 4-n-decylstyrene, more preferably styrene and alpha-methylstyrene, very preferably styrene.

(a4) Optionally at Least One Hydroxyalkyl (Meth)Acrylate:

The monomer (a4) is optional and may be a mixture of two or more monomers, as for example two to four, preferably two or three, and more preferably two monomers, but the optional use of precisely one monomer (a4) is preferred.

Preferred monomers (a4) are 2-hydroxyethyl (meth)acrylate, 2-hydroxypropyl (meth)acrylate, 3-hydroxypropyl (meth)acrylate and 4-hydroxybutyl (meth)acrylate, more preferably 2-hydroxyethyl acrylate, 2-hydroxyethyl methacrylate, 2-hydroxypropyl acrylate, 2-hydroxypropyl methacrylate, and 4-hydroxybutyl acrylate, very preferably 2-hydroxyethyl acrylate, 2-hydroxyethyl methacrylate, and 2-hydroxypropyl acrylate.

(a5) Optionally at Least One Acid-Group-Containing Monomer:

The monomer (a5) is optional and may be a mixture of two or more monomers, as for example two to four, preferably two or three, and more preferably two monomers, but the optional use of precisely one monomer (a5) is preferred.

Preferred monomers (a5) are acrylic acid, methacrylic acid, crotonic acid, itaconic acid, maleic acid or fumaric acid, more preferably acrylic acid and methacrylic acid, and very preferably acrylic acid.

The acids may optionally be at least partly neutralized with ammonium, potassium and/or sodium.

Other monomers, which may be incorporated into the copolymer (A) in minor amounts, are, for example, crosslinking monomers, such as internal crosslinkers, in other words those compounds which have at least two radically polymerizable double bonds, preferably 2 to 6, preferably 2 to 4, very preferably 2 to 3, and more particularly precisely 2. Mention may be made, by way of example, of allyl acrylate, allyl methacrylate, methallyl acrylate, methallyl methacrylate, di- and poly (meth)acrylates, 1,2-, 1,3-, and 1,4-butanediol diacrylate, 1,2- and 1,3-propylene glycol (meth)acrylate, 1,6-hexanediol di(meth)acrylate, 1,2-ethylene glycol di(meth)acrylate, neopentylglycol di(meth)acrylate, diethylene glycol di(meth)acrylate, triethylene glycol di(meth)acrylate, tetraethylene glycol di(meth)acrylate, trimethylolpropane tri(meth)acrylate, trimethylolethane tri(meth)acrylate, pentaerythritol tri (meth)acrylate and tetra(meth)acrylate, and divinylbenzene;

external crosslinkers, in other words compounds which lead to crosslinking of the polymer (A) after its preparation. Mention may be made, by way of example, of glycidyl (meth)acrylate, 2'-(acetylacetoxy)ethyl methacrylate, acetoacetoxyethyl acrylate, acetoacetoxypropyl methacrylate, acetoacetoxybutyl methacrylate, methacrylic acid 2'-(2"-oxoimidazolidin-1"-yl)ethyl ester (ureidoethyl methacrylate), diacetoneacrylamide (DAAM), and diacetonemethacrylamide.

The composition of the monomer mixture (a) may preferably be as follows:

(a1) at least 5%, preferably at least 15%, and more preferably at least 20% by weight and up to 50%, preferably up to 45%, and more preferably up to 40% by weight of at least one (meth)acrylate containing at least one cyclic carbonate group, (a2) at least 20%, preferably at least 30%, and more preferably at least 50% by weight and up to 90%, preferably up to 85%, and more preferably up to 80% by weight of at least one (cyclo)alkyl (meth)acrylate, (a3) 0% to 50%, preferably 0% to 40%, and more preferably 0% to 35% by weight of at least one vinylaromatic monomer, (a4) optionally up to 20%, preferably up to 15%, and more preferably 0% to 10% by weight of at least one hydroxyalkyl (meth)acrylate, and (a5) 0% to 5%, preferably 0% to 3%, more preferably at least 0% to 1% by weight of at least one acid-group-containing monomer;

other monomers are present optionally and in general in amounts of not more than 5% by weight, preferably not more than 3% by weight, and more preferably are not present;

with the proviso that the sum is always 100% by weight.

The copolymer (A) generally has a glass transition temperature (Tg) of −70 to 140° C., preferably 10 to 100° C., more preferably 15 to 80° C., and very preferably 20 to 60° C.

A calculation of the glass transition temperature by known methods based on tabulated values for particular monomers, such as by the method of Fox, for example, generally gives good approximation values, although in this specification the glass transition temperature is determined preferably in accordance with ASTM specification D3418-03 by way of differential scanning calorimetry (DSC), preferably with a heating rate of 10° C./min.

Monomers (a4) are preferably present when the coating compositions of the invention are to be reacted for curing with crosslinkers, examples being polyisocyanates or melamine-formaldehyde resins. This, however, is merely one optional possibility for the curing of the coating compositions of the invention, and is therefore less preferred. In this case, the OH number of the polymers (A) is preferably from 50 to 150 mg KOH/g, preferably from 70 to 130 and more preferably around 100 mg KOH/g.

Preferred copolymers (A) have a cyclic carbonate group content of at least 0.2 mol of cyclic carbonate groups per kg of copolymer (A), more preferably at least 0.3 mol/kg, very preferably at least 0.5, and more particularly at least 0.75 mol/kg.

In general, a cyclic carbonate group content of up to 3 mol/kg is sufficient, preferably up to 2.8, more preferably up to 2.5, and very preferably up to 2.2 mol/kg.

The weight-average molecular weight Mw of the polymer (A) is from 1500 to 200,000 g/mol, preferably 3000 to 200,000 g/mol, more preferably from 4000 to 100,000, very preferably from 5000 to 50,000, and more particularly from 7500 to 30,000.

In this specification, the weight-average molecular weight Mw, unless indicated otherwise, is determined by way of a size exclusion chromatography (SEC) with tetrahydrofuran +0.1% by weight trifluoroacetic acid as eluent, with a flow rate of 1 ml/min and a column temperature of 35° C. The sample is diluted in the eluent to a concentration of 2 mg/ml, and 100 µl of this diluted sample is injected, following filtration of the sample solution through a 0.2 µm filter (Sartorius Minisart SRP 25) to remove any gel fraction. As the columns, three columns having an internal diameter of 7.5 mm were combined as follows: 5 cm preliminary column (Plgel 10µ Guard preliminary column), followed by two 30 cm separating columns (each Plgel 10µ Mixed B). Detection was carried out by means of a differential refractometer Agilent 1100, UV photometer Agilent 1100 VWD, PSS SLD7000-BI-MwA (UV/254 nm/Agilent). Calibration was carried out with narrow-range polystyrene standards from Polymer Laboratories with molecular weights of M=580 to M=7 500 000, and also hexylbenzene (M=162). The values outside the elution range were extrapolated.

The polydispersity Mw/Mn is generally not more than 50, preferably not more than 30, and more preferably not more than 15.

The filtration which precedes the molecular weight determination removes any gel fraction in the polymer, and so the values reported relate to the sol fraction.

The insoluble fraction of the polymer can be determined by four-hour extraction with 2-methoxyethanol in a Soxhlet apparatus, with weighing of the residue which remains after drying to constant weight. The insoluble fraction of the polymer is preferably not more than 10% by weight, preferably not more than 5% by weight.

The solubility of the polymer (A) at 25° C. in 2-methoxyethanol is preferably at least 30% by weight, more preferably at least 50% by weight.

Suitable amines (B) have typically at least 2, preferably 2 to 6, more preferably 2 to 4 primary and/or secondary amine groups and in general 2 to 30 C atoms and may be aliphatic, cycloaliphatic or aromatic.

It is a feature of the invention that the compounds (B) have a fraction of tertiary amine groups, based on the total amount of primary, secondary, and tertiary amine groups, of less than 20%, preferably not more than 15%, more preferably not more than 10%, very preferably not more than 5%, and more particularly no tertiary amine groups. Where compounds (B) used are compounds which have a higher amount of tertiary amine groups, then, in accordance with the invention, compounds are admixed which have no tertiary amine groups or a lower amount of such groups, such that the total mixture of compounds (B) has the low tertiary amine group content in accordance with the invention. If, therefore, (B) is composed of a mixture of two or more diamines or polyamines, each having at least two amine groups, selected from the group consisting of primary and secondary amine groups, the low tertiary amine group content according to the invention relates to the mixture of these diamines or polyamines.

The calculation of the amine groups may be illustrated using tris(2'-aminoethyl)amine as an example: This compound has three primary amine groups and one tertiary amine group. The fraction of tertiary amine groups as a proportion of the total amount of amine groups is therefore 25%. N,N,N',N'-Tetrakis(3'-aminopropyl)-1,4-diaminobutane, on the other hand, has four primary and two tertiary amine groups, and so the fraction of tertiary amine groups amounts to one third.

Without wishing to be tied to any one explanation, it is supposed that tertiary amines, as a result of triple hyperconjugation or +I effect of the radicals on the nitrogen atom, exhibit a high electron density on the nitrogen atom, and so an oxidative attack is preferred more strongly at that point than if the amine in question were to be only a secondary or primary amine. Consequently, tertiary amines have a greater tendency to undergo decomposition and to cause yellowing under thermal and/or UV exposure than do other amines.

In contrast, the primary and/or secondary amine groups in the component (B) react with the carbonate (A) to form an amide structure in which, as a result of the electron-withdrawing carbonyl group, the electron density on the nitrogen atom is reduced. Consequently, the resultant structures display a lower tendency toward yellowing than do the amines known from the prior art.

One preferred embodiment of the present invention uses a mixture of two or more amines in the coating compositions of the invention, as for example two to six, preferably two to four, more preferably two or three, and more particularly two. With a mixture of amines it is possible to determine the properties of the coating obtained (see below).

The diamine or polyamine (B) is preferably selected from the group consisting of linear or branched $C_2$-$C_8$ (cyclo)alkylenediamines (B1) and polyetheramines (B2).

Linear or Branched $C_2$-$C_8$ (Cyclo)Alkylenedi- or -Polyamines (B1)

Diamines (B1) contemplated are preferably those of the formula $R^1$—NH—$R^2$—NH—$R^3$, in which $R^1$ and $R^3$ independently of one another are hydrogen or an alkyl radical, cycloalkyl radical, aryl radical or arylalkyl radical having 1 to 20 C atoms. The (cyclo)alkylene radical $R^2$ has 2 to 8 carbon atoms and may be linear, cyclic or mixedly aliphatic and cyclic.

Preferred diamines are, for example, ethylenediamine, the propylenediamines (1,2-diaminopropane and 1,3-diaminopropane), N-methylethylenediamine, tetramethylenediamine (1,4-diaminobutane), N,N'-dimethylethylenediamine, N-ethylethylenediamine, 1,5-diaminopentane, 1,3-diamino-2,2-dimethylpropane, 1,3-diamino-2,2-diethylpropane, 1,3-bis(methylamino)propane, hexamethylenediamine (1,6-diaminohexane), 4,4'-diaminodicyclohexylmethane, 1,2-, 1,3-, or 1,4-cyclohexylenediamine, 1,2-, 1,3-, or 1,4-bis(aminomethyl)cyclohexane, 1,5-diamino-2-methylpentane, 3-(propylamino)propylamine, isophoronediamine (IPDA), 3 (or 4), 8 (or 9)-bis(aminomethyl)tricyclo[$5.2.1.0^{2,6}$]decane isomer mixtures, 2-butyl-2-ethyl-1,5-pentamethylenediamine, 2,2,4- or 2,4,4-trimethyl-1,6-hexamethylenediamine, piperazine, 2-aminopropylcyclohexylamine, 3(4)-aminomethyl-1-methylcyclohexylamine, and 1,4-diamino-4-methylpentane.

Preference is given to ethylenediamine, 1,3-diamino-2,2-dimethylpropane, hexamethylenediamine, diaminodicyclohexylmethane, cyclohexylenediamine, isophoronediamine, 4,4'-diaminodicyclohexylmethane, and bis(aminomethyl)cyclohexane.

Suitable amines having three or more reactive primary and/or secondary amine groups are, for example, diethylenetriamine, dipropylenetriamine, N1-(2-aminoethyl)propane-1,3-diamine, tris(aminoethyl)amine, tris(aminopropyl) amine, tris(aminohexyl)amine, trisaminohexane, 4-aminomethyl-1,8-octanediamine, trisaminononane, oligomeric diaminodiphenylmethanes (polymeric MDA), bis (aminoethyl)amine, bis(aminopropyl)amine, bis(aminobutyl)amine, bis(aminopentyl)amine, bis(aminohexyl)amine, N-(2-aminoethyl)propanediamine, N,N'-bis(3-aminopropyl) ethylenediamine, N,N'-bis(3-aminopropyl)butanediamine, N,N,N',N'-tetra(3-aminopropyl)ethylenediamine, and also polyethyleneimines which are obtainable formally by reaction of ethyleneimine with amines as starter molecule.

Preferred amines having three or more reactive primary and/or secondary amine groups are diethylenetriamine, dipropylenetriamine, trisaminohexane, 4-aminomethyl-1,8-octanediamine, trisaminononane, bis(aminoethyl)amine, bis (aminopropyl)amine, bis(aminobutyl)amine, bis(aminopentyl)amine, bis(aminohexyl)amine, and N-(2-aminoethyl) propandiamine.

Polyetheramines (B2)

By polyetheramines are meant, in accordance with the invention, polyethers which carry amine groups.

Preferred polyetheramines are the aminated products of the compounds of the formula (IIa) to (IId),

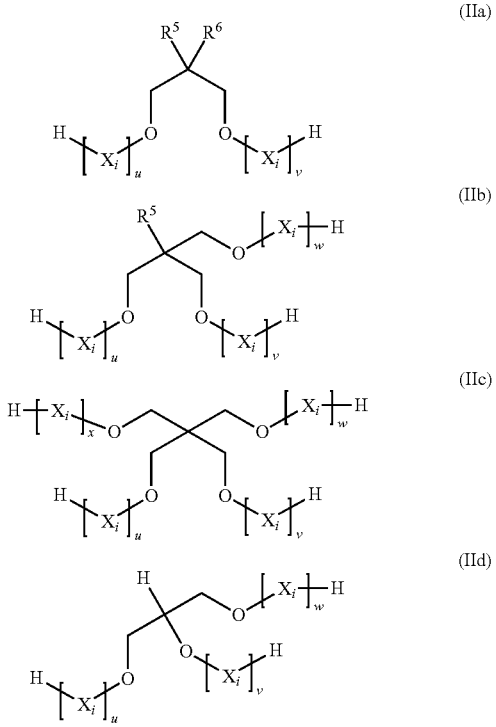

in which
$R^5$ and $R^6$ independently of one another are hydrogen or optionally aryl-, alkyl-, aryloxy-, alkyloxy-, heteroatom- and/or heterocycle-substituted $C_1$-$C_{18}$ alkyl,
u, v, w, and x independently of one another are each an integer from 1 to 10, preferably 1 to 5, and more preferably 1 to 3, and each $X_i$ for i=1 to u, 1 to v, 1 to w, and 1 to x, independently of one another, may be selected from the group —$CH_2$—$CH_2$—O—, —$CH_2$—$CH(CH_3)$—O—, —$CH(CH_3)$—$CH_2$—O—, —$CH_2$—$C(CH_3)_2$—O—, —$C(CH_3)_2$—$CH_2$—O—, —$CH_2$—CHVin-O—, —CHVin-$CH_2$—O—, —$CH_2$—CHPh-O—, and —CHPh-$CH_2$—O—, preferably from the group —$CH_2$—$CH_2$—O—, —$CH_2$—$CH(CH_3)$—O—, and —$CH(CH_3)$—$CH_2$—O—, and more preferably —$CH_2$—$CH_2$—O—, in which Ph is phenyl and Vin is vinyl.

Here, optionally aryl-, alkyl-, aryloxy-, alkyloxy-, heteroatom- and/or heterocycle-substituted $C_1$-$C_{18}$ alkyl means, for example, methyl, ethyl, propyl, isopropyl, n-butyl, sec-butyl, tert-butyl, pentyl, hexyl, heptyl, octyl, 2-ethylhexyl, 2,4,4-trimethylpentyl, decyl, dodecyl, tetradecyl, hexadecyl, octadecyl, 1,1-dimethylpropyl, 1,1-dimethylbutyl, 1,1,3,3-tetramethylbutyl, preferably methyl, ethyl or n-propyl, very preferably methyl or ethyl.

The products in question are preferably amination products of singly to vigintuply and more preferably triply to decuply ethoxylated, propoxylated or mixedly ethoxylated and propoxylated, and more particularly exclusively ethoxylated, neopentylglycol, trimethylolpropane, trimethylolethane or pentaerythritol.

Polyetheramines of this kind are obtainable, for example, from Huntsman Corporation under the names Jeffamine® D-2000 (aminated polypropylene glycol (on average 33 propylene glycol units) having a molar weight of around 2000 g/mol), Jeffamine® D-230 (aminated polypropylene glycol (on average 2.5 propylene glycol units) having a molar weight of around 230 g/mol), Jeffamine® D-400 (aminated polypropylene glycol (on average 6.1 propylene glycol units) having a molar weight of around 430 g/mol), Jeffamine® T-5000 (aminated propoxylated glycerol having a molar weight of around 5000 g/mol and a primary amine group content of at least 97%, based on the total amount of amine groups, and an equivalent weight of amine groups of 0.50-0.54 meq/g), and preferably Jeffamine® T-403 (aminated, pentuply to hextuply propoxylated trimethylolpropane having a primary amine group content of at least 90%, based on the total amount of amine groups, and an equivalent weight of amine groups of 6.2-6.5 meq/g).

Amination products are understood to be those products in which the hydroxyl groups have been replaced predominantly or completely by primary and/or secondary amine groups. In general, at least 75% of the hydroxyl groups are replaced, preferably at least 85%, more preferably at least 90%, and very preferably at least 95%.

Among the amines (B), the amines (B1) are preferred over the amines (B2).

Through the selection of the amines (B) it is possible to influence the properties of the coating obtained with the coating composition in question.

As a rough-and-ready rule it may be assumed here that sterically bulky amines (B) have a lower reactivity and hence an increased potlife (i.e., the time within which the coating composition is processable and does not show any increase in viscosity).

Sterically bulky amines are, for example, those in which at least one amine group is attached directly to at least one secondary or tertiary carbon atom. Examples of such amines are isophoronediamine, isopropyl-substituted or tert-butyl-substituted amines.

On the other hand, amines which are sterically less bulky and have predominantly, preferably exclusively, primary amine groups have the effect of good adhesion of the coatings to the substrate, particularly to metal substrates.

"Sterically less bulky" here means that the carbon atoms attached directly to the respective amine groups (a carbon atoms) are primary and the carbon atoms attached to them (β carbon atoms) are primary or secondary, i.e., that there is no substituent on the a carbon atom and there is not more than one substituent on the β carbon atom. Examples of such amines are 1,ω-alkylenediamines and the terminal primary amine groups of polyethyleneimines.

Furthermore, through the choice of the amine, it is possible to adjust the hardness or elasticity of the coating obtained.

By using individual amines (B) that are sterically less bulky, it is possible to obtain a coating with an increased elasticity, whereas sterically bulky amines result in a greater hardness.

Surprisingly, with mixtures of at least two amines (B), it is possible, independently of their steric bulk, to obtain very hard coatings.

In the two-component coating compositions of the invention, the molar ratio of primary and secondary amine groups in (B) to cyclic carbonate groups in (A) is generally from 5:1 to 1:5, preferably from 3:1 to 1:3, more preferably from 2:1 to 1:2, very preferably from 1.5:1 to 1:1.5, and more particularly from 1.2:1 to 1:1.2.

The two-component coating compositions of the invention may further comprise, as optional constituents, at least one solvent, at least one pigment and/or at least one additive.

Examples of solvents (C) that are contemplated include those in which the components (A) and (B) are soluble at typical application temperatures.

Examples of those used include ketones, esters, alkoxylated alkanoic acid alkyl esters, ethers, or mixtures of the solvents.

Esters are, for example, n-butyl acetate, ethyl acetate, 1-methoxyprop-2-yl acetate, and 2-methoxyethyl acetate.

Ethers are, for example, THF, dioxane, and also the dimethyl, diethyl or di-n-butyl ethers of ethylene glycol, diethylene glycol, triethylene glycol, propylene glycol, dipropylene glycol or tripropylene glycol.

Ketones are, for example, acetone, diethyl ketone, ethyl methyl ketone, isobutyl methyl ketone, methyl amyl ketone, and tert-butyl methyl ketone.

Preferred solvents are n-butyl acetate, ethyl acetate, 1-methoxyprop-2-yl acetate, 2-methoxyethyl acetate, and also mixtures thereof.

Other possible solvents are butylglycol diacetate (Merck Schuchardt OHG), butylglycol acetate (Merck Schuchardt OHG), dipropylene glycol dimethyl ether (Proglyde® DMM, Sigma-Aldrich, Germany), and propylene carbonate.

In addition it is also possible for virtually all common alcohols to be used as solvents, particular preference here being given to 2-methoxypropanol and 2-methoxyethanol.

Pigment (D)

Pigments in the true sense are, according to CD Römpp Chemie Lexikon—Version 1.0, Stuttgart/New York: Georg Thieme Verlag 1995, with reference to DIN 55943, particulate "colorants that are organic or inorganic, chromatic or achromatic, and are virtually insoluble in the application medium".

Virtually insoluble here means a solubility at 25° C. below 1 g/1000 g application medium, preferably below 0.5, more preferably below 0.25, very particularly preferably below 0.1, and in particular below 0.05 g/1000 g application medium.

Examples of pigments in the true sense comprise any desired systems of absorption pigments and/or effect pigments, preferably absorption pigments. There are no restrictions whatsoever on the number and selection of the pigment components. They may be adapted as desired to the particular requirements, such as the desired perceived color, for example. It is possible for example for the basis to be all the pigment components of a standardized mixer coating system.

Effect pigments are all pigments which exhibit a platelet-shaped construction and give a surface coating specific decorative color effects. The effect pigments are, for example, all of the pigments which impart effect and can be used typically in vehicle finishing and industrial coatings. Examples of such effect pigments are pure metallic pigments, such as aluminum, iron or copper pigments; interference pigments, such as titanium dioxide-coated mica, iron oxide-coated mica, mixed oxide-coated mica (e.g., with titanium dioxide and $Fe_2O_3$ or titanium dioxide and $Cr_2O_3$), metal oxide-coated aluminum; or liquid-crystal pigments, for example.

The coloring absorption pigments are, for example, typical organic or inorganic absorption pigments that can be used in the coatings industry. Examples of organic absorption pigments are azo pigments, phthalocyanine pigments, quinacridone pigments, and pyrrolopyrrole pigments. Examples of inorganic absorption pigments are iron oxide pigments, titanium dioxide, and carbon black.

Dyes are likewise colorants, and differ from the pigments in their solubility in the application medium; i.e., they have a solubility at 25° C. of more than 1 g/1000 g in the application medium.

Examples of dyes are azo, azine, anthraquinone, acridine, cyanine, oxazine, polymethine, thiazine, and triarylmethane dyes. These dyes may find application as basic or cationic dyes, mordant dyes, direct dyes, disperse dyes, development dyes, vat dyes, metal complex dyes, reactive dyes, acid dyes, sulfur dyes, coupling dyes or substantive dyes.

Coloristically inert fillers are all substances/compounds which on the one hand are coloristically inactive, i.e., exhibit a low intrinsic absorption and have a refractive index similar to that of the coating medium, and which on the other hand are capable of influencing the orientation (parallel alignment) of the effect pigments in the surface coating, i.e., in the applied coating film, and also properties of the coating or of the coating compositions, such as hardness or rheology, for example. Inert substances/compounds which can be used are given by way of example below, but without restricting the concept of coloristically inert, topology-influencing fillers to these examples. Suitable inert fillers meeting the definition may be, for example, transparent or semitrans-parent fillers or pigments, such as silica gels, blanc fixe, kieselguhr, talc, calcium carbonates, kaolin, barium sulfate, magnesium silicate, aluminum silicate, crystalline silicon dioxide, amorphous silica, aluminum oxide, microspheres or hollow microspheres made, for example, of glass, ceramic or polymers, with sizes of 0.1-50 μm, for example. Additionally as inert fillers it is possible to employ any desired solid inert organic particles, such as urea-formaldehyde condensates, micronized polyolefin wax and micronized amide wax, for example. The inert fillers can in each case also be used in a mixture. It is preferred, however, to use only one filler in each case.

Preferred fillers comprise silicates, examples being silicates obtainable by hydrolysis of silicon tetrachloride, such as Aerosil® from Degussa, siliceous earth, talc, aluminum silicates, magnesium silicates, calcium carbonates, etc.

Additive (E)

Further, typical coatings additives (E) used may be the following, for example: stabilizers, UV stabilizers such as UV absorbers and suitable free-radical scavengers (especially HALS compounds, hindered amine light stabilizers), activators (accelerators), drying agents, fillers, antistatic agents, flame retardants, thickeners, thixotropic agents, surface-active agents, viscosity modifiers, plasticizers or chelating agents. UV stabilizers are preferred.

Stabilizers are at least one compound having a stabilizing action, the term "stabilizing" identifying the capacity to reduce the development of a color number and/or of the viscosity of the coating composition in the course of storage over a certain period of time as compared with those corresponding mixtures which comprise no compounds having a stabilizing action.

Suitable UV absorbers comprise oxanilides, triazines and benzotriazole (the latter available, for example, as Tinuvin® products from BASF) and benzophenones (e.g., Chimassorb® 81 from BASF). Preference is given, for example, to 95% benzenepropanoic acid, 3-(2H-benzotriazol-2-yl)-5-(1, 1-dimethylethyl)-4-hydroxy-, C7-9-branched and linear alkyl esters; 5% 1-methoxy-2-propyl acetate (e.g., Tinuvin® 384) and α[3-[3-(2H-benzotriazol-2-yl)-5-(1,1-dimethylethyl)-4-hydroxyphenyl]-1-oxopropyl]-ω-hydroxypoly (oxo-1,2-ethanediyl) (e.g., Tinuvin® 1130), in each case products, for example, of BASF. DL-alpha-tocopherol, tocopherol, cinnamic acid derivatives, and cyanoacrylates can likewise be used for this purpose.

They can be employed alone or together with suitable free-radical scavengers, examples being sterically hindered amines (often also identified as HALS or HAS compounds; hindered amine (light) stabilizers) such as 2,2,6,6-tetramethylpiperidine, 2,6-di-tert-butylpiperidine or derivatives thereof, e.g., bis(2,2,6,6-tetramethyl-4-piperidyl) sebacate. They are obtainable, for example, as Tinuvin® products and Chimassorb® products from BASF. Preference in joint use with Lewis acids, however, is given to those hindered amines which are N-alkylated, examples being bis(1,2,2,6,6-pentamethyl-4-piperidinyl) [[3,5-bis(1,1-dimethylethyl)-4-hydroxyphenyl]methyl]butylmalonate (e.g., Tinuvin® 144 from BASF); a mixture of bis(1,2,2,6,6-pentamethyl-4-piperidinyl)sebacate and methyl(1,2,2,6,6-pentamethyl-4-piperidinyl) sebacate (e.g., Tinuvin® 292 from BASF); or which are N—(O-alkylated), such as, for example, decanedioic acid, bis(2,2,6,6-tetramethyl-1-(octyloxy)-4-piperidinyl) ester, reaction products with 1,1-dimethylethyl hydroperoxide and octane (e.g., Tinuvin® 123 from BASF).

UV stabilizers are used typically in amounts of 0.1% to 5.0% by weight, based on the solid components present in the preparation.

Suitable thickeners include, in addition to free-radically (co)polymerized (co)polymers, typical organic and inorganic thickeners such as hydroxymethylcellulose or bentonite.

Chelating agents which can be used include, for example, ethylenediamineacetic acid and salts thereof and also β-diketones.

The constitution of the coating compositions of the invention is for example as follows:
(A) 30% to 80%, preferably 40% to 70%, more preferably 50-60% by weight,
(B) 5% to 20%, preferably 10% to 15%, by weight,
(C) 0% to 60%, preferably 10% to 50%, and more preferably 20% to 40% by weight,
(D) 0% to 30%, preferably 10-20%, by weight,
(E) 0-10%, preferably 0% to 5%, by weight,
with the proviso that the sum of these components is always 100% by weight.

The coating compositions may optionally comprise, as customary crosslinkers, polyisocyanate and/or melamine-formaldehyde resins, particularly when the polymer (A) comprises hydroxyl groups, i.e., if at least one monomer (a4) is copolymerized. These crosslinkers, however, serve merely to support the curing of the coating composition, which in accordance with the invention takes place primarily through reaction of components (A) and (B). In one preferred embodiment, the coating composition of the invention comprises no substantial amounts of polyisocyanates and/or melamine-formaldehyde resins, i.e., in each case less than 10%, preferably less than 5%, and more preferably 0% by weight.

The coating compositions of the invention are prepared by mixing of the components, more particularly of components (A) and (B), shortly before application to the substrate. Here, for example, the components (A) and one or more of the other components (C), (D), and (E) may already be present in the form of a premix, and are then mixed with the missing component (B).

"Shortly before application" here means that premix and missing component are mixed with one another in a time period prior to application to the substrate within which trouble-free processability is ensured—that is, the coating composition continues to be fluid and amenable to application without defects. Of course, the period is less than the gel time. The processing window is frequently defined as the time within which the viscosity may not increase by more than twice relative to the initial viscosity. Processing at as close as possible to the original viscosity is preferred.

This mixture is applied and subsequently, at ambient temperature to 150° C., the coating-material mixture is cured. If a solvent (C) is present, it may be preferable to evaporate or flash off at least part of the solvent in a drying step.

Depending on temperature and reactivity of component (B), the coating composition is cured after 10 minutes to 6 hours, preferably 20 minutes to 4 hours, more preferably 30 minutes to 3 hours, and very preferably after 1 to 2 hours.

In one preferred variant the coating-material mixture is cured at 20 to 80° C., more preferably to 60° C. (e.g., for refinish applications or for large objects which are difficult to place inside an oven).

In another preferred application, the coating-material mixture is cured at 110-150° C., preferably at 120-140° C. (e.g., for OEM applications).

By "curing" in the context of the present invention is meant the generation of a tack-free coating on a substrate, by the heating of the coating composition that has been applied to the substrate, at the temperature indicated above, for at least until at least the desired tack-free state has come about.

A coating composition in the context of the present specification is a mixture of at least components (A) and (B), which is intended for coating at least one substrate for the purpose of forming a film and, after curing, a tack-free coating.

The substrates are coated by typical methods known to the skilled person, with at least one coating composition being applied in the desired thickness to the substrate to be coated, and the volatile constituents of the coating composition that are optionally present being removed, optionally with heating. This operation may if desired be repeated one or more times. Application to the substrate may take place in a known way, as for example by spraying, troweling, knifecoating, brushing, rolling, roller coating, flow coating, laminating, injection backmolding or coextruding.

The thickness of a film of this kind for curing may be from 0.1 µm up to several mm, preferably from 1 to 2.000 µm, more preferably 5 to 200 µm, very preferably from 5 to 60 µm (based on the coating material in the state in which the solvent has been removed from the coating material).

Additionally provided by the present invention are substrates coated with a coating composition of the invention.

Coating compositions of this kind are especially suitable for applications requiring particularly high application reliability, exterior weathering resistance, optical qualities, solvent resistance, chemical resistance, and water resistance.

The two-component coating compositions and coating formulations obtained are suitable for coating substrates such as wood, wood veneer, paper, cardboard, paperboard, textile, film, leather, nonwoven, plastics surfaces, glass, ceramic, mineral building materials, such as molded cement blocks and fiber-cement slabs, or metals, which in each case may optionally have been precoated or pretreated.

Coating compositions of this kind are suitable as or in interior or exterior coatings, i.e., in those applications where there is exposure to daylight, preferably of parts of buildings, coatings on (large) vehicles and aircraft, and industrial applications, utility vehicles in agriculture and construction, decorative coatings, bridges, buildings, power masts, tanks, containers, pipelines, power stations, chemical plants, ships, cranes, posts, sheet piling, valves, pipes, fittings, flanges, couplings, halls, roofs, and structural steel, furniture, windows, doors, wood block flooring, can coating, and coil coating, for floor coverings, such as in parking levels or in hospitals, and in automotive finishes, as OEM and refinish.

In particular the coating compositions of the invention are used as clearcoat, basecoat, and topcoat material(s), primers, and surfacers.

EXAMPLES

Polymer A

Initial Charge
150.630 g 1-Methoxy-2-propanol
Feed 1
98.440 g Glycerol carbonate acrylate
56.250 g Methyl methacrylate
42.200 g Styrene
56.250 g n-Butyl acrylate
28.130 g n-Butyl methacrylate
Feed 2
11.250 g tert-Butyl peroctoate
41.600 g 1-Methoxy-2-propanol
Feed 3
1.410 g tert-Butyl peroctoate
17.750 g 1-Methoxy-2-propanol
Operation A 1 L polymerization vessel was charged with 150.63 g of 1-methoxy-2-propanol, and this initial charge was heated to 120° C. under a nitrogen atmosphere and with stirring. At 120° C., feed 1 and feed 2 were commenced and were metered in over 2 hours. Subsequently feed 3 was metered in over the course of 0.25 hour. After the end of the addition, the resulting reaction mixture was stirred at 120° C. for 120 minutes more. This gave a polymer solution. The polymer solution thus prepared was clear and colorless. It had a solids content of 48.4% and a viscosity of 432 mPas (Brookfield, spindle 3/50 rpm, 20° C.). The K value, determined by the method of Fikentscher, was 15.0 (1% strength in methoxypropanol, in accordance with DIN EN ISO 1628-1). The glass transition point was determined by DSC and was 26° C. in accordance with DIN 51005.

Polymer B
Initial Charge
150.630 g 1-Methoxy-2-propanol
Feed 1
98.440 g Glycerol carbonate acrylate
84.380 g 2-Ethylhexyl acrylate
98.440 g Styrene
Feed 2
11.250 g tert-Butyl peroctoate
141.600 g 1-Methoxy-2-propanol
Feed 3
1.410 g tert-Butyl peroctoate
17.750 g 1-Methoxy-2-propanol
Operation A 1 L polymerization vessel was charged with 150.63 g of 1-methoxy-2-propanol, and this initial charge was heated to 120° C. under a nitrogen atmosphere and with stirring. At 120° C., feed 1 and feed 2 were commenced and were metered in over 2 hours. Subsequently feed 3 was metered in over the course of 0.25 hour. After the end of the addition, the resulting reaction mixture was stirred at 120° C. for 120 minutes more. This gave a polymer solution. The polymer solution thus prepared was clear and colorless. It had a solids content of 47.6% and a viscosity of 324 mPas (Brookfield, spindle 3/50 rpm, 20° C.). The K value, determined by the method of Fikentscher, was 15.6 (1% strength in methoxypropanol, in accordance with DIN EN ISO 1628-1).

The glass transition point was determined by DSC and was 38° C. in accordance with DIN 51005.

Polymer C
Initial Charge
150.630 g 1-Methoxy-2-propanol
Feed 1
84.400 g Glycerol carbonate acrylate
106.900 g Methyl methacrylate
28.100 g Styrene
61.900 g n-Butyl acrylate
Feed 2
11.250 g tert-Butyl peroctoate
141.600 g 1-Methoxy-2-propanol
Feed 3
1.410 g tert-Butyl peroctoate
17.750 g 1-Methoxy-2-propanol
Operation A 1 L polymerization vessel was charged with 150.63 g of 1-methoxy-2-propanol, and this initial charge was heated to 120° C. under a nitrogen atmosphere and with stirring. At 120° C., feed 1 and feed 2 were commenced and were metered in over 2 hours. Subsequently feed 3 was metered in over the course of 0.25 hour. After the end of the addition, the resulting reaction mixture was stirred at 120° C. for 120 minutes more. This gave a polymer solution. The polymer solution thus prepared was clear and colorless. It had a solids content of 48.4% and a viscosity of 548 mPas (Brookfield, spindle 3/50 rpm, 20° C.). The K value, determined by the method of Fikentscher, was 14.7 (1% strength in methoxypropanol, in accordance with DIN EN ISO 1628-1).

The glass transition point was determined by DSC and was 22° C. in accordance with DIN 51005.

Application Examples

Experimental procedure for the production of carbonate coatings on the substrates. The amines were combined and mixed in the weight proportions reported in table 1. Subsequently, as set out in table 1, the respective two-component system was mixed on a roller bed at room temperature until the mixture produced was uniform. The coating material, which was still not fully cured, was applied rapidly using a four-way bar applicator to the respective substrate (glass for determination of the hardness, and Bonder sheet for determination of the elasticity), and cured in a drying oven at 100° C. for 30 minutes.

The Erichsen cupping was determined in accordance with DIN 53156. For this purpose, using a four-way bar applicator, each inventive preparation was applied in a wet film thickness of 200 μm to Bonder sheet 132. Curing was carried out in the manner described above. The Erichsen cupping was then determined by pressing a metal ball into the uncoated side of the sheet. High values denote high flexibility.

Pendulum damping took place in accordance with DIN 53157, high values denote high hardness.

Amines used were as follows:

| Amine No.: | |
|---|---|
| 1 | Tris(2-aminoethyl)amine |
| 2 | Diethylenetriamine |
| 3 | Dipropylenetriamine |
| 4 | 2,2-Dimethylpropylenediamine |
| 5 | 3-(2-(Aminoethylamino)propylamine) |
| 6 | 4,4'-Methylenebiscyclohexylamine |
| 7 | Isophoronediamine |
| 8 | 1 + 7 = 50%:50% by weight |
| 9 | 2 + 7 = 50%:50% by weight |
| 10 | 1 + 4 + 7 = 33.3%:33.3%:33.3% by weight |
| 11 | 2 + 4 + 7 = 33.3%:33.3%:33.3% by weight |
| 12 | Polyetheramin T-403 |

Polyetheramin T-403: aminated, pentuply to hextuply propoxylated trimethylolpropane having an average molar weight of approximately 440 g/mol, obtainable from BASF SE, Ludwigshafen.

TABLE 1

Mixing proportions

| Polymer | Amount [g] | Amine No. | Amounts [g] |
|---|---|---|---|
| A | 17.3158 | 1 | 0.8307 |
| A | 17.2986 | 2 | 0.8781 |
| A | 17.5521 | 3 | 1.1333 |
| A | 17.3787 | 4 | 0.8737 |
| A | 17.6251 | 5 | 1.0164 |
| A | 10.4971 | 6 | 1.0866 |
| A | 10.6301 | 7 | 0.8907 |
| A | 5.0558 | 8 | 0.3331 |
| A | 5.0477 | 9 | 0.3396 |
| A | 5.0532 | 10 | 0.3066 |
| A | 5.0463 | 11 | 0.3109 |
| A | 5.1288 | 12 | 0.7403 |
| B | 17.4673 | 1 | 0.8171 |
| B | 17.2991 | 3 | 1.0892 |
| B | 17.7409 | 4 | 0.8698 |
| B | 17.428 | 5 | 0.9801 |
| B | 10.7132 | 6 | 1.0814 |
| B | 10.5294 | 7 | 0.8604 |
| B | 5.3968 | 8 | 0.3467 |
| B | 5.1877 | 9 | 0.3404 |
| B | 5.0465 | 10 | 0.2986 |
| B | 5.1022 | 11 | 0.3066 |
| B | 5.0823 | 12 | 0.7154 |
| C | 17.3008 | 1 | 0.7114 |
| C | 17.3901 | 3 | 0.9624 |
| C | 17.7477 | 5 | 0.8773 |
| C | 10.5489 | 6 | 0.9359 |
| C | 10.8428 | 7 | 0.7788 |
| C | 5.0847 | 8 | 0.2871 |
| C | 5.0621 | 9 | 0.2919 |
| C | 5.0711 | 10 | 0.2638 |
| C | 5.0590 | 11 | 0.2672 |
| C | 5.2086 | 12 | 0.6444 |

Results of the coating compositions: Pendulum hardness and Erichsen cupping

| Polymer | Amine No. | Thickness [μm] | Pendulum hardness | | Erichsen cupping | |
|---|---|---|---|---|---|---|
| A | 1* | 66.3 | 148 | 144 | 7.7 | 7.8 |
| A | 2 | 83.1 | 119 | 120 | 8.1 | 8.1 |
| A | 3 | 65.3 | 101 | 116 | 8.0 | 8.0 |
| A | 4 | 83.3 | 160 | 155 | 8.2 | 8.3 |
| A | 5 | 80.1 | 120 | 123 | 8.1 | 8.1 |
| A | 6 | 63.57 | 193 | 195 | 0.2 | 0.2 |
| A | 7 | 70.45 | 196 | 196 | 0.4 | 0.3 |
| A | 8 | 42.97 | 174 | 181 | 8.1 | 8.4 |
| A | 9 | 37.43 | 197 | 195 | 0.8 | 0.8 |
| A | 10 | 36.92 | 196 | 200 | 8.1 | 8.5 |
| A | 10 (85%) | 34.22 | 167 | 168 | 7.0 | 6.7 |
| A | 11 | 38.04 | 197 | 199 | 0.9 | 0.9 |
| A | 12 | 31.57 | 15 | 15 | 9.0 | 9.0 |
| B | 1* | 62.8 | 144 | 143 | 8.1 | 8.2 |
| B | 3 | 69.4 | 125 | 122 | 9.0 | 8.4 |
| B | 4 | 76.8 | 144 | 144 | 8.9 | 8.8 |
| B | 5 | 83.1 | 120 | 125 | 8.9 | 8.5 |
| B | 6 | 74.13 | 171 | 175 | 0.3 | 0.3 |
| B | 7 | 62.85 | 169 | 171 | 0.3 | 0.3 |
| B | 8 | 37.79 | 181 | 183 | 8.4 | 8.4 |
| B | 9 | 43.50 | 172 | 176 | 8.2 | 8.3 |
| B | 10 | 36.44 | 186 | 186 | 8.5 | 8.6 |
| B | 10 (85%) | 42.66 | 154 | 150 | 8.7 | 8.6 |
| B | 11 | 42.76 | 172 | 176 | 8.7 | 8.9 |
| B | 11 (85%) | 35.32 | 109 | 102 | 8.8 | 8.9 |
| B | 12 | 29.09 | <14 | <14 | >9 | >9 |
| C | 1* | 67.1 | 150 | 154 | 8.0 | 8.0 |
| C | 3 | 69.8 | 106 | 119 | 8.4 | 8.4 |
| C | 5 | 85.3 | 85 | 97 | 8.6 | 8.6 |
| C | 6 | 69.87 | 197 | 196 | 0.2 | 0.2 |
| C | 7 | 26.34 | 199 | 197 | 9.3 | 9.2 |
| C | 8 | 35.79 | 192 | 183 | 2.1 | 1.0 |
| C | 9 | 33.78 | 178 | 193 | 0.7 | 0.6 |
| C | 10 | 31.73 | 199 | 200 | 0.6 | 0.6 |
| C | 10 (85%) | 36.54 | 179 | 179 | 2.0 | 1.9 |
| C | 11 | 35.85 | 192 | 199 | 0.6 | 0.5 |
| C | 12 | 30.86 | 21 | 21 | >9 | >9 |

*Amine No. 1 (Tris(2-aminoethyl)amine) as comparison

It is evident from the results that the cyclic amines 6 and 7, relative to the comparison amine 1, produce coatings having a significantly higher hardness, but with a drop in flexibility.

Through mixtures of amines it may be possible to increase both hardness and elasticity with respect to the comparison; see amine mixtuers 8 or 10 in comparison to amine 1.

The invention claimed is:

1. A two-component coating composition comprising
at least one copolymer (A) which carries at least one cyclic carbonate group,
an amine component (B) comprising at least two amines which are diamines, polyamines, or a mixture thereof, where each of the amines has at least two amine groups selected from the group consisting of primary and secondary amine groups,
at least one solvent (C) in which the components (A) and (B) are soluble,
optionally at least one pigment (D), and
optionally at least one additive (E),
wherein the amine component has a fraction of tertiary amine groups, based on the total amount of primary, secondary, and tertiary amine groups, of less than 20%;
the molar ratio of primary and secondary amino groups in (B) to cyclic carbonate groups in (A) is from 1.2:1 to 1:5; and
the copolymer (A) is obtainable by radical polymerization of a monomer mixture comprising
(a1) at least one (meth)acrylate containing at least one cyclic carbonate group,
(a2) at least one additional (cyclo)alkyl (meth)acrylate,
(a3) at least one vinylaromatic monomer, (a4) optionally at least one hydroxyalkyl (meth)acrylate, and (a5) optionally at least one acid-group-containing monomer.

2. The coating composition according to claim 1, wherein the monomer (a1) is selected from the group consisting of (2-oxo-1,3-dioxolan-4-yl)methyl acrylate and (2-oxo-1,3-dioxolan-4-yl)methyl methacrylate.

3. The coating composition according to claim 1, wherein the monomer (a2) is selected from the group consisting of methyl acrylate, methyl methacrylate, ethyl acrylate, n-butyl acrylate, tert-butyl acrylate, and 2-ethylhexyl acrylate.

4. The coating composition according to claim 1, wherein the monomer (a3) is selected from the group consisting of styrene and alpha-methylstyrene.

5. The coating composition according to claim 1, wherein the copolymer (A) has a glass transition temperature (Tg) of 10 to 100° C.

6. The coating composition according to claim 1, wherein one of the diamine or polyamine is selected from the group consisting of linear or branched $C_2$-$C_8$ (cyclo)alkylenediamines (B1) and polyetheramines (B2).

7. The coating composition according to claim 1, wherein one of the diamine or polyamine is selected from the group consisting of ethylenediamine, 1,3-diamino-2,2-dimethylpropane, hexamethylenediamine, diaminodicyclohexylmethane, cyclohexylenediamine, isophoronediamine, and bis(aminomethyl)cyclohexane.

8. The coating composition according to claim 1, wherein one of the diamine or polyamine is an amination product of singly to viginituply ethoxylated, propoxylated or mixedly ethoxylated and propoxylated neopentylglycol, trimethylolpropane, trimethylolethane or pentaerythritol.

9. A process for preparing a coating composition according to claim 1, which comprises mixing components (A) and (B) with one another.

10. A method for coating a substrate, which comprises coating the substrate with a coating composition according to claim 1, wherein components (A) and (B) are mixed with one another shortly before application to the substrate, and subjecting the coated substrate subsequently to thermal treatment at ambient temperature up to 150° C.

11. The method according to claim 10, wherein the substrate is selected from the group consisting of wood, wood veneer, paper, paperboard, cardboard, textile, film, leather, nonwoven, plastics surfaces, glass, ceramic, mineral building materials, and metals, each of which may optionally have been precoated.

12. A two-component coating composition consisting of
30% to 80% by weight of at least one copolymer (A) which carries at least one cyclic carbonate group,
5% to 20% by weight of an amine component (B) comprising at least two amines which are diamines, polyamines, or a mixture thereof, where each of the amines has at least two amine groups selected from the group consisting of primary and secondary amine groups,
0% to 60% by weight of at least one solvent (C) in which the components (A) and (B) are soluble,
0% to 30% by weight of at least one pigment (D), and
0% to 10% by weight of at least one additive (E),
with the proviso that the sum of these components is always 100% by weight;
wherein the amine component has a fraction of tertiary amine groups, based on the total amount of primary, secondary, and tertiary amine groups, of less than 20%;
the molar ratio of primary and secondary amino groups in (B) to cyclic carbonate groups in (A) is from 1.2:1 to 1:5;
the copolymer (A) is obtainable by radical polymerization of a monomer mixture comprising at least one (meth) acrylate containing at least one cyclic carbonate group; and
either copolymer (A) or the amine component is separated from the remaining components of the composition.

13. The coating composition according to claim 1, wherein the amine component comprises tris(2-aminoethyl)amine and isophoronediamine.

14. The coating composition according to claim 1, wherein the amine component comprises diethylenetriamine and isophoronediamine.

15. The coating composition according to claim 1, wherein the amine component comprises tris(2-aminoethyl)amine, 2,2-dimethylpropylenediamine and isophoronediamine.

16. The coating composition according to claim 1, wherein the amine component comprises diethylenetriamine, 2,2-dimethylpropylenediamine and isophoronediamine.

17. The coating composition according to claim 1, wherein the monomer (a2) comprises 2-ethylhexyl acrylate.

* * * * *